United States Patent
Fernando et al.

(10) Patent No.: US 7,971,066 B2
(45) Date of Patent: *Jun. 28, 2011

(54) TRANSACTION DEVICE WITH NOISE SIGNAL ENCRYPTION

(75) Inventors: Llavanya Fernando, San Jose, CA (US); Nathan C. Wang, San Jose, CA (US); G. F. R. Sulak Soysa, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 287 days.

This patent is subject to a terminal disclaimer.

(21) Appl. No.: 12/135,513

(22) Filed: Jun. 9, 2008

(65) Prior Publication Data
US 2008/0232600 A1    Sep. 25, 2008

Related U.S. Application Data

(63) Continuation of application No. 10/384,010, filed on Mar. 7, 2003, now Pat. No. 7,392,396.

(60) Provisional application No. 60/363,034, filed on Mar. 7, 2002.

(51) Int. Cl.
*H04L 9/00* (2006.01)
*H04K 1/00* (2006.01)

(52) U.S. Cl. .................. 713/184; 713/189; 380/44

(58) Field of Classification Search .................. None
See application file for complete search history.

(56) References Cited

U.S. PATENT DOCUMENTS

| 6,084,966 | A  | * | 7/2000 | Maebara et al. | ............. 380/43 |
| 6,363,152 | B1 | * | 3/2002 | Cornelius et al. | ........... 380/255 |
| 7,392,396 | B2 | * | 6/2008 | Fernando et al. | ............. 713/184 |
| 2003/0120936 | A1 | * | 6/2003 | Farris et al. | ................ 713/189 |
| 2007/0121933 | A1 | * | 5/2007 | Futa et al. | ...................... 380/1 |

FOREIGN PATENT DOCUMENTS
WO    WO 98/12615    *    3/1998

* cited by examiner

*Primary Examiner* — Christopher A Revak

(57) ABSTRACT

A transaction device adds or injects a random noise component into signals representing (x,y) coordinate signals associated with user interface with an input screen associated with the device. The noise component can be generated by converting to analog the output of a random number generator, and then adding the noise component to the x-axis and/or y-axis component of the (x,y) coordinate signal. Alternatively the noise component can be injected into the x-axis and/or y-axis operating potential for the input screen. The result is a masking of the original (x,y) positional information. The randomly generated number is only available internal to the device. The device can use this number to de-crypt the true (x,y) signals, which signals can then be re-encrypted before transmitting from the device.

18 Claims, 5 Drawing Sheets

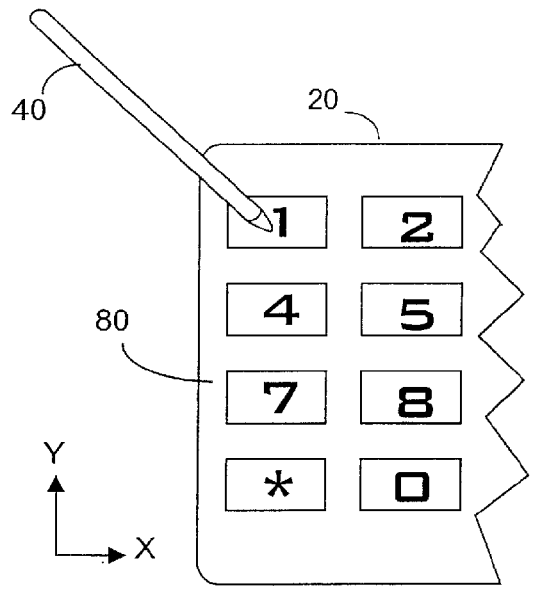
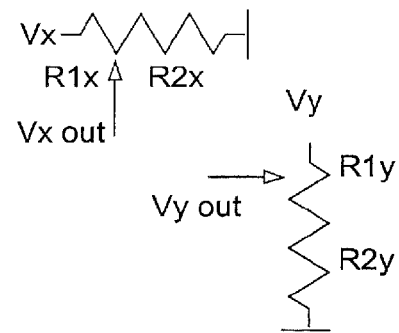
FIG. 3A-1    FIG. 3A-2
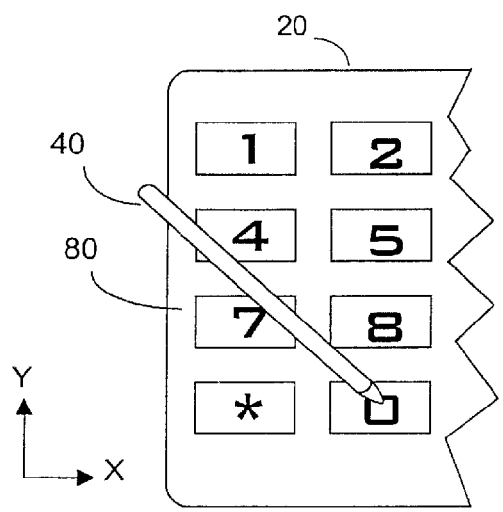
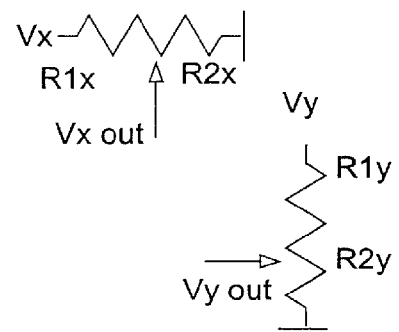
FIG. 3B-1    FIG. 3B-2

TRANSACTION DEVICE WITH NOISE SIGNAL ENCRYPTION

RELATIONSHIP TO PENDING APPLICATION

This application is a Continuation application of U.S. patent application Ser. No. 10/384,010, now U.S. Pat. No. 7,392,396 filed on Mar. 7, 2003 entitled "Transaction Device with Noise Signal Encryption", which claims the priority to the U.S. Provisional Application Ser. No. 60/363,034, entitled "Transaction Device with Noise Signal Encryption," filed Mar. 7, 2002. The specification of the above-identified application is incorporated herewith by reference.

FIELD OF THE INVENTION

The invention relates generally to electronic transaction devices including point of sale (POS) devices, and more particularly to increasing the security of data encryption within such devices.

BACKGROUND OF THE INVENTION

In recent years, electronic transaction devices such as point of sale (POS) devices, ATMs, personal digital assistants (PDAs), personal computers (PCs), and bank system networks have found much use in commerce. Transactions involving such devices are carried out everyday over media including the Internet, as well as through POS or bank system networks. Such transactions typically request from the customer-user private information such as a personal identification number (PIN), signature, password, or some other form of private identification. A merchant involved in the transaction uses such private information to verify authenticity of the user's identity, and to authorize the transaction.

Understandably it is important that such private information be protected from access by authorized parties. Should such private information fall into the wrong hands, the user may be at risk for identity theft and for fraudulent transactions, perhaps the user's credit card information. The unauthorized party may utilize the user's private information to fraudulently perform transactions ostensibly on behalf of the unsuspecting user. Prior art systems are designed to try to maintain integrity of user private information when such information is transmitted or promulgated from the transaction device to a remote device. However is it also important to adequately secure user private information within the transaction device itself. While various techniques have been developed to encrypt user private information within a transaction device, further protection for such data is needed.

What is needed is a method and mechanism by which private user information input to a transaction device can be better protected within the device. Preferably such protection should be greater than what is presently available using conventional encryption techniques.

The present invention provides such a method and mechanism to enhance security of user private information within a transaction device.

SUMMARY OF THE INVENTION

The present invention provides a transaction device with improved encryption to protect user private information data input to the transaction device. The transaction device preferably includes an input pad that may be part of the device display screen, whereon a user inputs information into the device. User input can be defined by (x,y) coordinate locations on the input pad. Internal to the transaction device, signals proportional to the coordinate locations are combined with randomly generated signals, which results in encryption of the original (x,y) coordinate locations. Knowledge of the randomly generated signals is limited solely to the device, which knowledge can allow the device to decrypt the encrypted coordinate signals before output transmission. If desired, security of user information can be enhanced by partitioning the device display screen such that the input pad is displayed in certain regions of the display, and user input to areas in these regions will be encrypted, according to the present invention.

Other aspects and advantages of the invention will become apparent from the following detailed description, taken in conjunction with the accompanying drawings, illustrated by way of example of the principles of the invention.

BRIEF DESCRIPTION OF THE DRAWINGS

FIGS. 3A-1, 3A-2, 3B-1, 3B-2, 3C, and 3D depict generation and use of an (x,y) coordinate signal output corresponding to user activation of a portion of the input screen, and use of such signal in randomized encryption, according to the present invention;

DETAILED DESCRIPTION OF THE PREFERRED EMBODIMENTS

Figure 1:
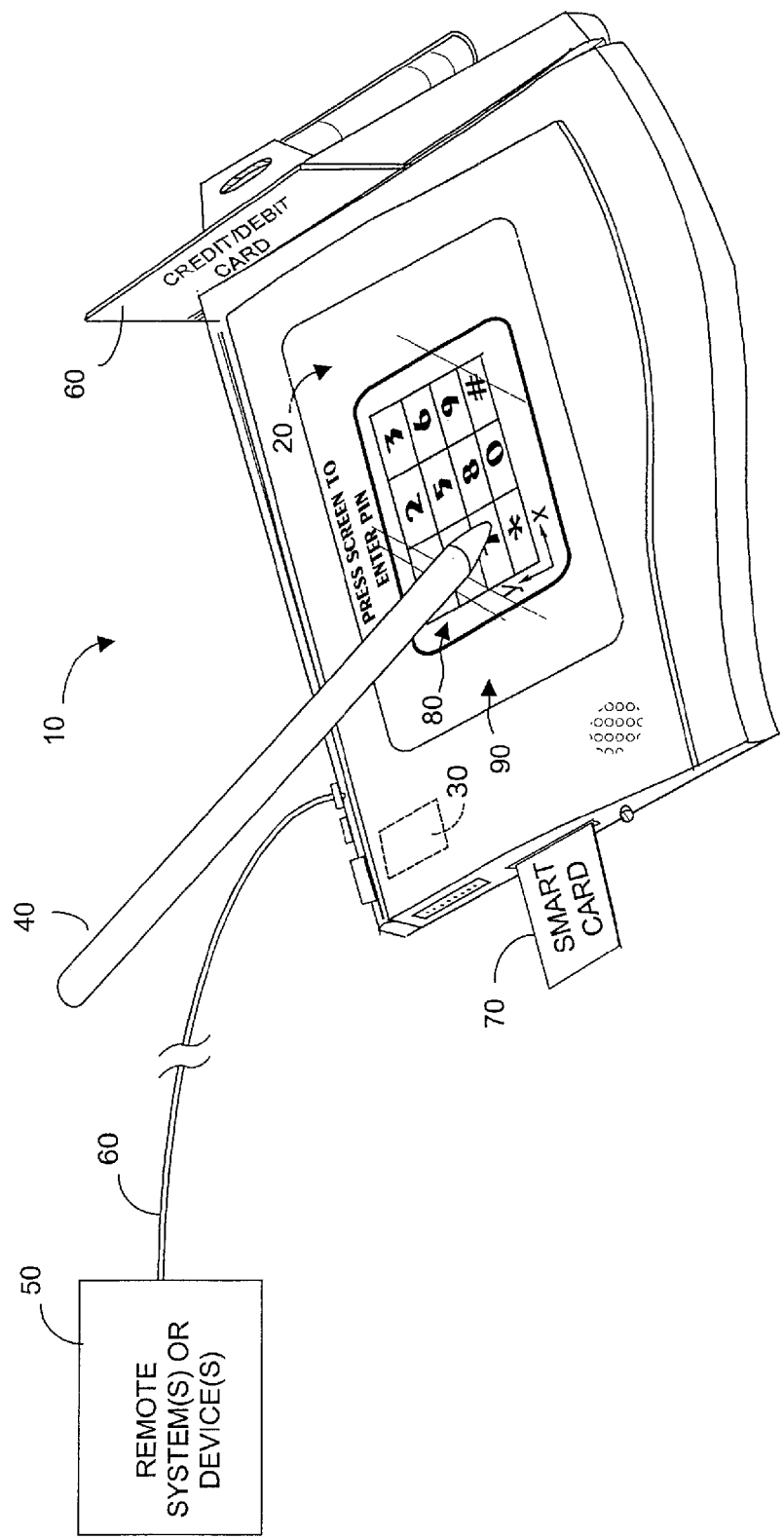
FIG. 1 depicts an exemplary embodiment of a transaction device, according to the present invention.

FIG. 1 depicts an exemplary embodiment of a transaction device 10 configured for operation by a user. Although device 10 is shown as a point-of-sale (POS) device such as may be used when paying for a transaction at a merchant store, it is understood that device 10 could instead be a personal digital assistant (PDA), a personal computer, a kiosk terminal, and so forth. In an exemplary embodiment, transaction device 10 includes a screen 20 that preferably can display information for the user and can also be used to receive information input by the user, for example a screen sensitive to at least one of touch, pressure, electrical charge, interruption of light, and heat resulting from user interface with the screen. Device 10 typically operates responsive to internal electronics 30, which electronics preferably includes electronics and/or software to encrypt data input by a user to device 10. In one embodiment, screen 20 is configured to both display information to the user and receive input from the user, for example using a stylus 40 (that may be a passive stylus), or even the user's finger. In the embodiment shown in FIG. 1, device 10 can receive a user's credit/debit card 60 and/or a user's smart card 70.

It is understood that the above description of device 10 is intended to be general, and in some devices separate screens for device display and for user input may be provided. In many applications, transaction device 10 can communicate with other device(s) or system(s) 50 via one or more communications paths 60 that may include hard wiring, wireless communications including, for example, use of infrared, radio frequency, microwave energies, cellular telephony systems, Bluetooth communications, and so forth.

Electronics 30 (which may include software and/or firmware) within device 10 encrypts at least user private data before transmission to remote system 50, for example using well known encryption algorithms such as DES, Triple DES, and the like. Device 10 preferably also uses a cipher key management scheme such as DUKPT, Master/Session, and the like to promote user data security. Such processes may be understood to be carried out by unit 30 within device 10. However unit 30 enhances encryption protection by combining the output from a random number generator within unit 30 with a signal representing the (x,y) location on the input screen or pad 20 of device 10. The randomly generated number is available only to device 10, which can use this information to decrypt the encrypted (x,y) positional information before output transmission.

In FIG. 1, for example, device 10 is shown as including a combination display/input screen 20 that permits a user to view displayed information and also to input information or data into device 10 by interfacing with the display screen, using stylus 40. or perhaps a finger. Thus, user-controlled stylus 40 is shown pressing a virtual key with a number "7" displayed on a so-called soft personal identification number (PIN) pad, perhaps to facilitate user entry of a PIN or other user private information that is to be protected within device 10. ting at present in secure mode or non-secure mode. The remaining portion of display/input screen 20 may be used to display non-private information, e.g., an invitation to the user to input what may be private user information. As the distal tip of stylus 40 is pressed near or into the surface of the soft PIN pad displayed in region 80, an (x,y) coordinate representing the point of contact is generated by device 10 for use by electronics 30. If the stylus is dragged or moved about on display/input screen 20, the resultant coordinate values will of course change.

Figure 2:
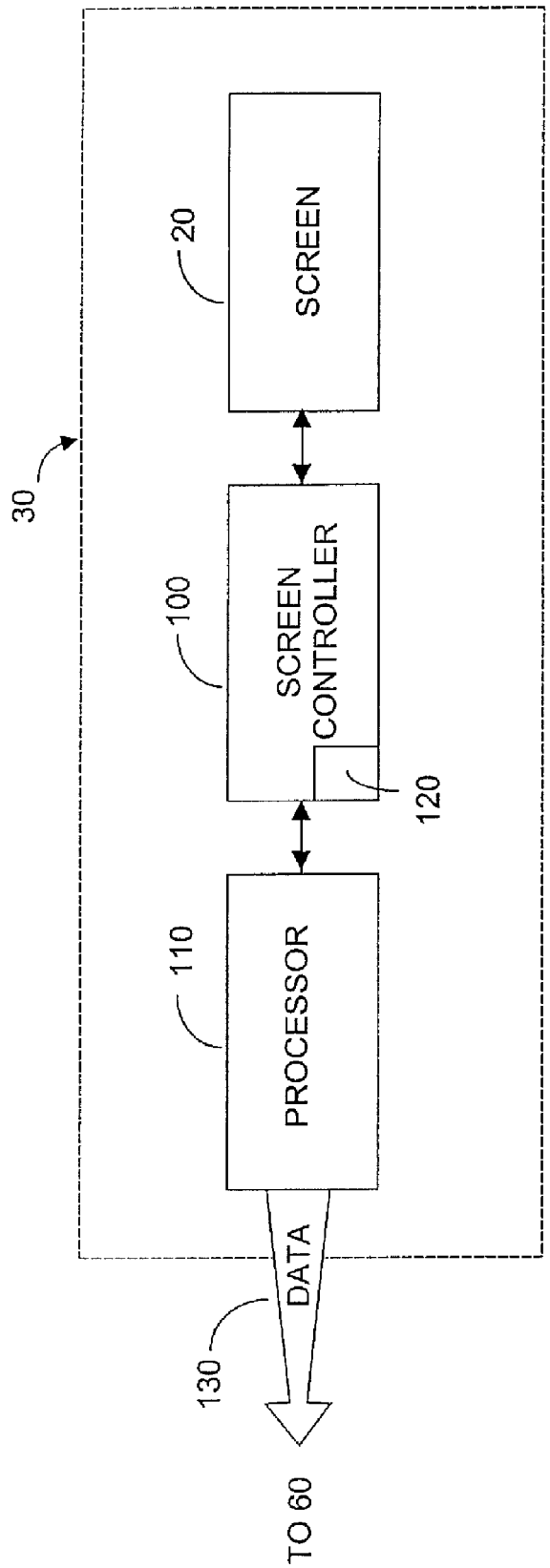
FIG. 2 depicts a simplified block diagram of an exemplary transaction device, according to the present invention.

FIG. 2 is a simplified block diagram of electronics 30 within transaction device 10, according to the present invention. Electronics 30 includes and/or controls the combination display/input screen 20, a display/input screen controller 100, and a processor 110, coupled as shown in FIG. 2. If desired, screen controller 100 may be housed within display/input screen 20 to enhance security by making it difficult for a would be hacker to physically gain access to the screen controller and to private user information. In another embodiment, screen controller 100 and display/input screen 20 are fabricated as a single component. Understandably such housing or fabrication of screen controller 100 does not expose interface wiring or connections between screen controller 100 and display/input screen 20 to probes or other attempts by a hacker to gain access to information passing into or out of screen controller 100. Electronics 30 also includes circuitry and/or software and/or firmware to implement enhanced encryption of user input data, according to the present invention.

In one embodiment, screen controller 110 is configured to receive information for display on screen 20 from processor 110, and to instruct display/input screen 20 to output the display information for user viewing. Screen controller 100 may modify the format of display information for the display/input screen 20.

Screen controller 100 preferably is also configured to receive input information from display/input screen 20, for example information input by user interaction with the screen itself. User information input via display/input screen 10 describes a particular location on the surface of the display/input screen, for example (x,y) coordinates. Screen controller 100 receives this input information from display/input screen 20 and uses this coordinate information in conjunction with a random number generator 120 to generate an encryption key used by screen controller module 100 to encrypt data input by the user into device 10, prior to transmission of date, including the encrypted data, via line 60 to remote device(s) and/or system(s) 50. The output transmission from device 10 is depicted in FIG. 2 as data flow 130.

Advantageously, the user input data is encrypted by module 100 as soon as the data is received into device 10. Thus even if an unauthorized person took possession of device 10 with the user's date stored within, the data would be unintelligible unless the encryption could somehow be broken, and the encrypted data unencrypted. Preferably absent an encryption-decryption key, generated according to the present invention, a thief gaining physical access to device 10 would not gain meaningful access to encrypted data within the device.

In one embodiment, processor 110 is configured to receive encrypted information from screen controller 220 and process the encrypted information along with the encryption key, generated according to the present invention. As noted, this key is required to successfully decrypt the encrypted information. Processor 110 is also configured to send display data to screen controller 100 housed within display/input screen 20.

As noted, typically the user interacts with device 10 via display/input screen 20, which screen couples to screen controller 100 (x,y) coordinate information as to the locus of user interaction with the screen. To promote overall security of device 10, screen controller 100 modifies this (x,y) coordinate input information and preferably generates a signal proportional to (x,y) for use in generating an encryption-decryption key. Because the (x,y) coordinate input information has intentionally been altered and encrypted, an unauthorized party gaining access to device 10 cannot recover from the device the original, true, (x,y) coordinate information. Thus if a user separately input as a PIN the digits 30642 by "touching" the corresponding virtual or soft keys displayed on device 10 (e.g., see FIG. 1), a hacker gaining access to device 10 would not be able to reconstruct the physical areas that the user contacted, and thus could not reconstruct the private user information that the PIN was 30642. Processor 110 receives the encrypted information from screen controller 100 including the key that is generated according to the present invention Thus in FIG. 2, data flowing from screen controller 100 to processor 110 is encrypted and thus is secure and less prone to access by a hacker who has gained access to device 10, than if more conventional prior art techniques were practiced. In one embodiment, processor 110 can encrypt information received from screen controller 100 using standard encryption techniques, and the thus-encrypted information becomes part of data flow 130 to be transmitted or output beyond device 10.

FIGS. 3A-1 and 3B-1 depict a generic method of using (x,y) coordinate position resulting from regions of display/input screen 20 to generate at least one signal (Vx out, Vy out) proportional to the region of the screen activated by user interface, for example contacted or adjacent a user's finger or stylus 40. In FIG. 3A, a portion of a virtual PIN pad is displayed in region 80 of display/input screen 20, with a number of virtual input keys shown. As noted earlier, display/input screen 20 can be implemented to respond to various types of user interface, e.g., pressure, light interruption, heat generation, electrical charge impressed upon the screen surface, change in resistance or capacitance across the screen, and so forth.

For ease of illustration in FIGS. 3A-1-3B-2, assume that display/input screen 20 is resistive, which is to say that contact upon the screen at various (x,y) coordinate positions is measurable in terms of resistance across the screen, in the x-axis direction and in the y-axis direction. Assume for the sake of convenience that (x,y) positions near the top left of the screen (e.g., near virtual input key "1") in FIG. 3A-1 are characterized by low resistive impedance, and that positions near the bottom right corner of the screen (e.g., near virtual input key "#" in FIG. 1) are characterized by increasing values of impedance in each axis direction.

Looking at FIG. 3A-2, assume that the total impedance left-to-right across the entire screen 20 in the x-axis is given by the sum of resistance values $R1x+R2x$. Assume also that the total impedance, top-to-bottom down the entire screen 20 in the y-axis is given by the sum of resistance values $R1y+R2y$. For ease of understanding FIG. 3A-2 (and FIG. 3B-2) depicts changes in (x,y) position as through there were conventional x-axis and y-axis potentiometers whose wipers moved right-to-left and top-to-bottom as stylus 40 made contact from the left side upper corner of the screen, moving toward the right lower corner of the screen. If an x-axis voltage Vx were impressed across the x-axis impedance and if a y-axis voltage Vy were impressed across the y-axis impedance of display/input screen 20, the electrical equivalent would appear as shown in FIGS. 3A-2 and 3B-2.

Thus if FIG. 3A-2, magnitude of $R1x$ is relatively small compared to $R1x$ in FIG. 3B-21, since in FIG. 3B-1 there is movement rightward along the x-axis compared to the stylus position in FIG. 3A-1. Similarly, comparing the figures, there is a downward movement in the y-axis direction between stylus position in FIG. 3A-1 compared to FIG. 3B-1. Accordingly magnitude of $R1y$ is shown smaller in FIG. 3A-2 compared with magnitude of $R2y$ in FIG. 3B-2.

Figure 3C:
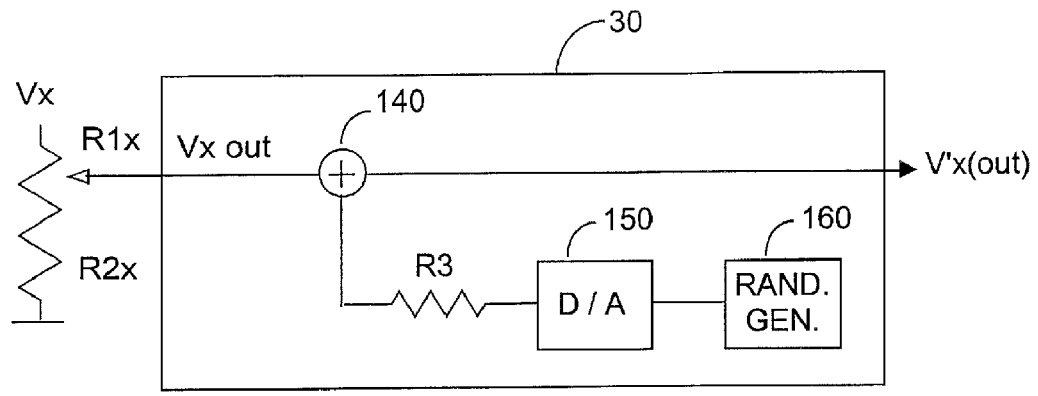
Figure 3D:
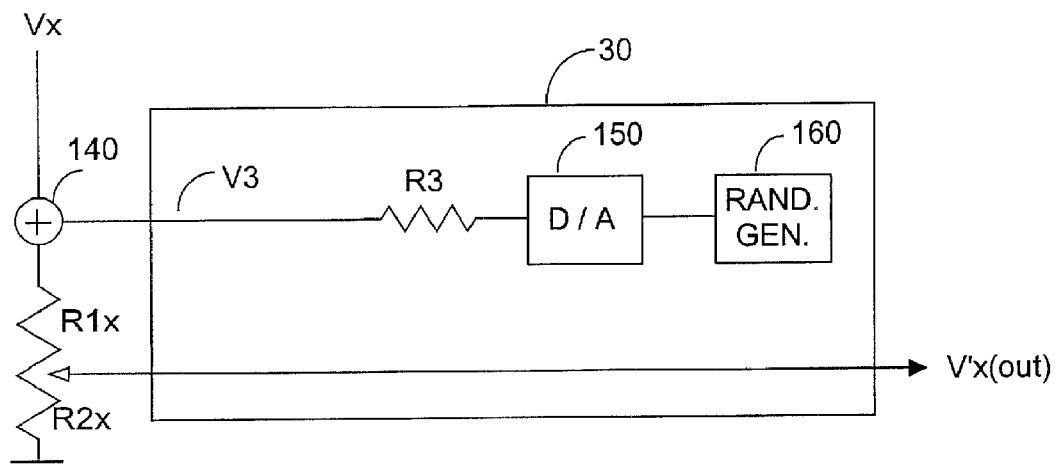

FIGS. 3C and 3D are simplified schematic diagrams depicting alternate configurations in which a randomized encrypted signal can be generated by transaction device 10. Assume that FIGS. 3C and 3D address only horizontal or x-axis information relating to user interface with displace/input screen 20. Understandably equivalent schematic diagrams could also be presented for vertical or y-axis information.

In FIG. 3C, the signal Vx out is shown at the equivalent of a potentiometer "wiper" associated with the x-axis impedance across screen 20. Under the assumptions noted above, magnitude of Vx out will increase at user-interface with screen 20 moves from (x,y) positions at the left edge of the screen toward (x,y) positions nearer the right edge of the screen. The Vx out signal is summed with an adder 140 with a randomly generated signal input to adder 140, e.g., via a resistor R3. It is understood that so-called adder 140 is not limited to a strictly summing type device, e.g., an operational amplifier summer, but can include a mechanism that can receive direct injection of a randomly generated signal.

The randomly generated signal is created by taking the digital output from a random number generator 160 and passing that signal through a digital-to-analog converter 150 to create an analog signal of random amplitude that is summed in adder 140 with Vx out. The resultant signal, denoted V'x (out) represents a masked version of the original (x,y) user interface position upon screen 20. Since V'x(out) has a random component, namely the analog version of the output from the random number generator, a hacker attempting to recreate Vx out (and thus the x-component of the (x,y) user interface on screen 20) has what appears to be a near impossible task. It is understood that adder 140, digital-to-analog convert 150, random number generator 160, resistor R3 and any other associated components are present within electronics 30, depicted in FIG. 1.

Consider now the alternative configuration shown in FIG. 3D. In this embodiment, a random noise generated signal V3 is essentially superimposed or injected into the (x,y) signal associated with the location of the user interface with display/input screen 20. The result is that the output signal (V'x(out)) taken from the equivalent of a "wiper" associated with the screen disguises the original (x,y) user interface screen position by virtue of the injected random noise signal V3. Again, a hacker would be thwarted in an attempt to learn from the V'x(out) signal the true original (x,y) coordinates, and thus could not readily learn what sequence of what virtual PIN keys might have been used to generate a PIN or a password.

In various embodiments it can be advantageous to incorporate at least random number generator 160 within screen controller module 100 and/or display/input screen 20. Such configurations promote security of information within transaction device 10. It will be appreciated from the various embodiments that the use of an injected or added noise signal component (which is to say an analog version of a randomly generated digital signal) encrypts the true user interface (x,y) positions across display/input screen 20.

In one embodiment, V'x(out) is coupled to processor 110, along with the randomly generated number used to create the noise component. Given the random number, processor 110 can recapture the original (x,y) user interface positions from the V'x(out) signal.

Figure 4:
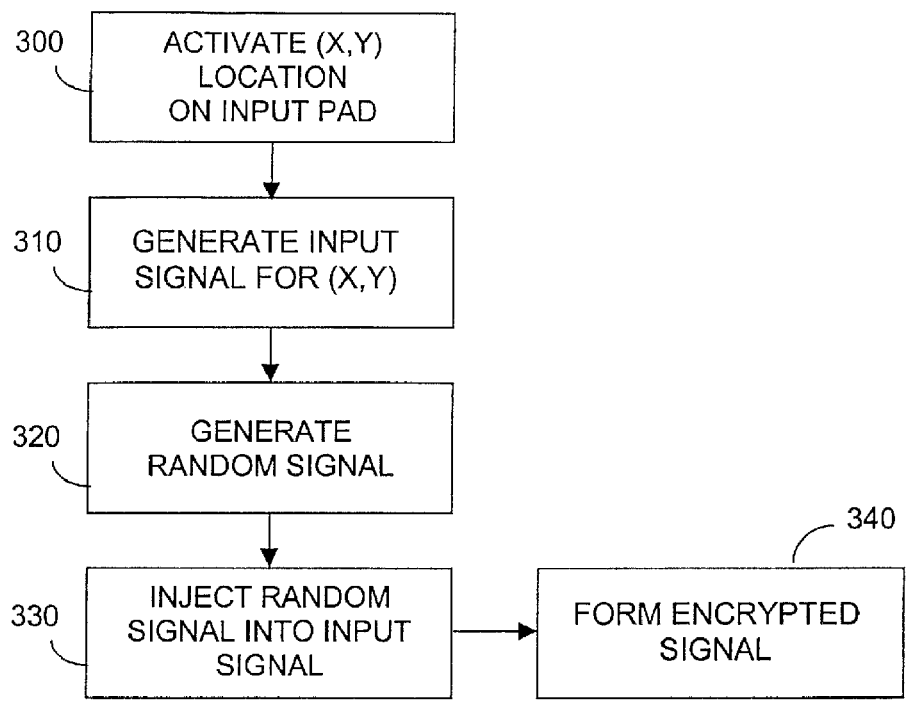
FIG. 4 is a simplified flow chart depicting randomized encryption according to a first embodiment of the present invention.
Figure 5:
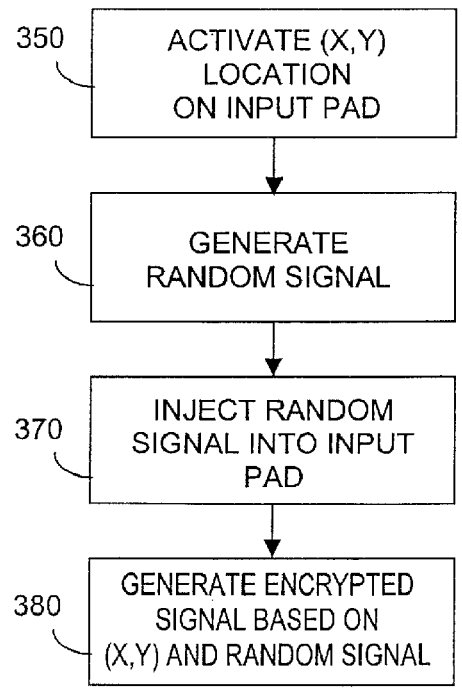
FIG. 5 is a simplified flow chart depicting randomized encryption according to a second embodiment of the present invention.

FIGS. 4 and 5 are exemplary flow diagrams by which random noise signals are injected into the (x,y) user interface positions for a transaction device 10. It is noted that the sequence of the steps shown in FIGS. 4 and 5 may be altered if desired. Further, the method steps shown in these figures may be performed in more or fewer steps if desired.

Looking first at FIG. 4, at step 300, using a finger, a stylus 40 or the like, a user will interface with at least one region of display/input screen 20, and thus activate (x,y) coordinate information, for example on a virtual PIN input pad as shown in FIG. 1, and FIGS. 3A-1, and 3B-1. At step 310, an input signal is generated for the thus-activated (x,y) location, for example, a Vx out and/or a Vy out signal, as shown in FIGS. 3A-2, 3B-2, 3C, and 3D. At step 320, which may in fact occur before steps 300, 310, a random signal is generated, for example by converting to analog the output from a random number generator, as shown in FIGS. 3C and 3D. At step 330, the random signal is injected or added, essentially as a random noise component, into the (x,y) input signal Vx out and/or Vy out, to yield an encrypted signal at step 340, for example V'x(out) or V'y(out).

In the method shown in FIG. 5, user interface with display/input screen 20 at step 350 activates (x,y) location information, perhaps on a portion of a virtual PIN pad as shown in some of the figures. At step 360, which may occur before step 350, a random signal is generated, for example as described above with respect to step 320 in FIG. 4. In FIG. 5 at step 370, the random signal is injected into the operating voltage supply for the input portion of display/input screen 20, essentially randomly modulated the operating voltage Vx or Vy with the injected random noise signal. At step 380, an encrypted signal is generated based upon the true (x,y) information as modulated by the injected random noise signal.

Modifications and variations may be made to the disclosed embodiments without departing from the subject and spirit of the invention, as defined by the following claims.

What is claimed is:

1. A transaction device for receiving a user input, the transaction device comprising:
   a user-interfaceable surface for generating an x-axis signal and a y-axis signal;
   a signal generating unit generating a random analog signal; and
   an arithmetic unit generating an encrypted output signal by adding the random analog signal to at least one of the x-axis signal and the y-axis signal, wherein the adding comprises at least one of (i) combining the random analog signal with a source of electrical potential from which the x-axis and y-axis signals are generated and (ii) combining the random analog signal with the at least one signal.

2. The transaction device of claim 1, wherein the signal generating unit and the arithmetic unit comprise electronic components housed within the transaction device.

3. The transaction device of claim 1, further comprising:
   a processor;
   a screen controller coupled to the processor and to the user-interfaceable surface;
   wherein the processor reproduces the x-axis signal and the y-axis signal by decrypting the encrypted output signal using the random analog signal.

4. The transaction device of claim 3, further comprising:
   an encryption unit encrypting the x-axis signal and the y-axis signal after the processor performs the decryption; and
   a communication interface outputting the encrypted x-axis signal and the encrypted y-axis signal.

5. The transaction device of claim 1, wherein the arithmetic unit directly sums the random analog signal with the at least one of the x-axis signal and the y-axis signal.

6. The transaction device of claim 1, wherein the arithmetic unit injects the random analog signal.

7. The transaction device of claim 1, wherein the user-interfaceable surface is a display-input screen that can output information from the transaction device and can respond to the user input.

8. The transaction device of claim 1, wherein the user-interfaceable surface comprises a material responsive to a change in pressure exerted against the user-interfaceable surface.

9. The transaction device of claim 1, wherein the user-interfaceable surface is responsive to heat transferred to the user-interfaceable surface.

10. The transaction device of claim 1, wherein the user-interfaceable surface is responsive to changes in light incident upon the user-interfaceable surface.

11. The transaction device of claim 1, wherein the user-interfaceable surface is responsive to infrared energy incident upon the user-interfaceable surface.

12. A method for encrypting signals corresponding to locations on a user-interfaceable surface of a transaction device, the method comprising:
   receiving an x-axis signal and a y-axis signal generated as a function of a location of a user input on the user-interfaceable surface;
   generating a random analog signal; and
   generating an encrypted output signal by adding the random analog signal to at least one of the x-axis signal and the y-axis signal, wherein the adding comprises at least one of (i) combining the random analog signal with a source of electrical potential from which the x-axis and y-axis signals are generated and (ii) combining the random analog signal with the at least one signal.

13. The method of claim 12, wherein the user-interfaceable surface is a display-input screen that can output information from the transaction device and can respond to the user input.

14. The method of claim 12, wherein the method is carried out by electronics disposed within a housing of the transaction device.

15. The method of claim 12, further comprising:
   disposing within a housing of the transaction device electronics carrying out the method;
   the electronics including at least a screen controller and a processor;
   the processor coupled to the screen controller, and the screen controller coupled to the user-interfaceable surface; and
   coupling the encrypted output signal to the processor;
   wherein the processor can decrypt the encrypted output signal.

16. A system for encrypting signals corresponding to locations on a user-interfaceable surface of a transaction device, the system comprising:
   means for receiving an x-axis signal and a y-axis signal generated as a function of a location of a user input on the user-interfaceable surface;
   means for generating a random analog signal; and
   means for generating an encrypted output signal by adding the random analog signal to at least one of the x-axis signal and the y-axis signal, wherein the adding comprises at least one of (i) combining the random analog signal with a source of electrical potential from which the x-axis and y-axis signals are generated and (ii) combining the random analog signal with the at least one signal.

17. The system of claim 16, wherein the user-interfaceable surface is a display-input screen that can output information from the transaction device and can respond to the user input.

18. The system of claim 16, wherein the system includes electronics disposed within a housing of the transaction device.

* * * * *

UNITED STATES PATENT AND TRADEMARK OFFICE
CERTIFICATE OF CORRECTION

PATENT NO. : 7,971,066 B2  
APPLICATION NO. : 12/135513  
DATED : June 28, 2011  
INVENTOR(S) : Fernando et al.

Page 1 of 1

It is certified that error appears in the above-identified patent and that said Letters Patent is hereby corrected as shown below:

IN THE SPECIFICATION

1. In Column 3, Line 20, delete "40." and insert -- 40, --, therefor.

2. In Column 3, Line 25, delete "10. ting" seems to be incorrect.

3. In Column 3, Line 54, delete "screen controller 110" and insert -- screen controller 100 --, therefor.

4. In Column 4, Lines 44-45, delete "Invention" and insert -- Invention. --, therefor.

5. In Column 5, Line 29, delete "FIG. 3B-21," and insert -- FIG. 3B-2, --, therefor.

Signed and Sealed this  
Fourth Day of December, 2012

David J. Kappos  
*Director of the United States Patent and Trademark Office*